(12) United States Patent
Park et al.

(10) Patent No.: US 12,531,137 B2
(45) Date of Patent: Jan. 20, 2026

(54) DEVICE AND METHOD FOR DESIGNING MATERIAL USING DEEP LEARNING

(71) Applicants: Seoul National University R&DB Foundation, Seoul (KR); Center for Advanced Meta-Materials, Daejeon (KR)

(72) Inventors: Namkyoo Park, Seoul (KR); Sunkyu Yu, Seoul (KR); Xianji Piao, Seoul (KR)

(73) Assignees: CENTER FOR ADVANCED META-MATERIALS, Daejeon (KR); Seoul National University R&DB Foundation, Seoul (KR)

( * ) Notice: Subject to any disclaimer, the term of this patent is extended or adjusted under 35 U.S.C. 154(b) by 1071 days.

(21) Appl. No.: 17/644,445

(22) Filed: Dec. 15, 2021

(65) Prior Publication Data

US 2022/0293225 A1 Sep. 15, 2022

(30) Foreign Application Priority Data

Mar. 15, 2021 (KR) .................. 10-2021-0033525

(51) Int. Cl.
*G16C 60/00* (2019.01)
*G06N 3/04* (2023.01)
*G06N 3/08* (2023.01)
*G06V 10/145* (2022.01)

(52) U.S. Cl.
CPC ............... *G16C 60/00* (2019.02); *G06N 3/04* (2013.01); *G06N 3/08* (2013.01); *G06V 10/145* (2022.01)

(58) Field of Classification Search
None
See application file for complete search history.

(56) References Cited

U.S. PATENT DOCUMENTS

| 10,957,419 | B2 * | 3/2021 | Yoo ........................ G16B 15/00 |
| 2020/0082916 | A1 | 3/2020 | Polykovskiy et al. |
| 2020/0294630 | A1 | 9/2020 | Miller et al. |

OTHER PUBLICATIONS

Tan, R.K., Zhang, N.L. & Ye, W. A deep learning-based method for the design of microstructural materials. Struct Multidisc Optim 61, 1417-1438 (2020) (Year: 2020).*

* cited by examiner

*Primary Examiner* — Rehana Perveen
*Assistant Examiner* — Eric A Post
(74) *Attorney, Agent, or Firm* — Osha Bergman Watanabe & Burton LLP

(57) ABSTRACT

Provided are a device and method for designing a material using deep learning. The method includes training a decoder which derives wave properties from given information on a material in advance, training an autoencoder including the decoder and an encoder which will be trained to derive information on a material from given wave properties, and inputting targeted wave properties to the trained encoder to acquire information on a material satisfying the input wave properties.

6 Claims, 9 Drawing Sheets

DEVICE AND METHOD FOR DESIGNING MATERIAL USING DEEP LEARNING

CROSS-REFERENCE TO RELATED APPLICATION

This application claims priority to and the benefit of Korean Patent Application No. 2021-0033525, filed on Mar. 15, 2021, the disclosure of which is incorporated herein by reference in its entirety.

BACKGROUND

1. Field of the Invention

The present invention relates to a device and method for designing a material using deep learning, and more particularly, to a technique for designing a material in consideration of medium properties for general wave signals, such as quantum, electron, light, and sound, using deep learning.

2. Discussion of Related Art

Deep learning technology means a methodology for identifying complex and nonlinear relationships between arbitrary variables in physical, social, or technical systems, which can be applied to regression analysis, classification, and inverse design through training an artificial neural network on the basis of a large number of pieces of data acquired through various experiments, numerical analysis, etc. The corresponding technology has become the core of data science and software-based artificial intelligence technology and shows remarkable performance in natural language processing, voice recognition, image processing, etc. compared to existing methods.

Meanwhile, in the case of transmitting a signal in the form of a wave, such as optical communications or radio-frequency technologies, the quality of the signal propagation is better with the media having higher error robustness against errors caused upon system defects or signal noises. Also, in the case of modulating a signal represented by a wave, the modulation efficiency is higher when the wave is changed more sensitively to material modulation. Therefore, in terms of active signal processing which requires both signal propagation and modulation such as switching, logic devices, transistor technologies, etc, the performance of a device may be considered excellent when a wave is less sensitive to errors, and at the same time, is more sensitive to modulation.

However, modulation and errors applied to a wave are factors which fundamentally change a state of the wave. Accordingly, in many cases, a wave is generally sensitive or insensitive to both of modulation and errors, and such a trade-off relationship is considered as determining the performance limitation of a wave-based device.

In this regard, research and development continues on a method of designing materials having properties which are not found in nature such as a metamaterial and a metasurface. When a method of generally designing a material and then analyzing wave properties thereof is available, a theoretical technique may be enough to design a simple structure. However, when the complexity or nonlinearity of wave-matter interactions increases, many computation resources and numerous trial-and-error attempts are required to design a material having desired wave properties.

A related art of the present invention is disclosed in Korean Patent Publication No. 10-2020-0073845 (Jun. 24, 2020).

SUMMARY OF THE INVENTION

The present invention is directed to allowing development of a new material which overcomes the trade-off limitation between error robustness and modulation efficiency and thus is robust to errors and very sensitive to modulation with respect to wave signals, in particular, to providing a device and method for designing a material using deep learning which provides an automatic inverse design a corresponding new material from given wave properties.

According to an aspect of the present invention, there is provided a method of designing a material using deep learning, the method including pre-training a decoder which derives wave properties from given information on a material, training an autoencoder including the decoder and an encoder which will be trained to derive information on a material from given wave properties, and inputting targeted wave properties to the trained encoder to acquire information on a material satisfying the input wave properties.

The given information on the material may include at least a structure of the material.

The pre-training of the decoder may include converting the information on the material into an image form.

The conversion of the information on the material into the image form may include calculating a positional displacement of each particle in a crystal structure which each particle is periodically arranged and representing the calculated positional displacement as an image to convert the structure of the material into an image form.

The conversion of the information on the material into the image form may include representing the calculated positional displacement as brightness of a pixel to convert the structure of the material into the image form.

The pre-training of the decoder may include training the decoder using training data including information on materials and wave properties of the materials.

The given information on the material may further include a type of each particle of the material.

The autoencoder may be implemented in the form of a convolutional neural network (CNN), a recurrent neural network (RNN), or a deep neural network (DNN).

According to another aspect of the present invention, there is provided a device for designing a material using deep learning, the device including a processor and a memory coupled to the processor. The memory includes instructions configured to cause the processor to perform the method.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
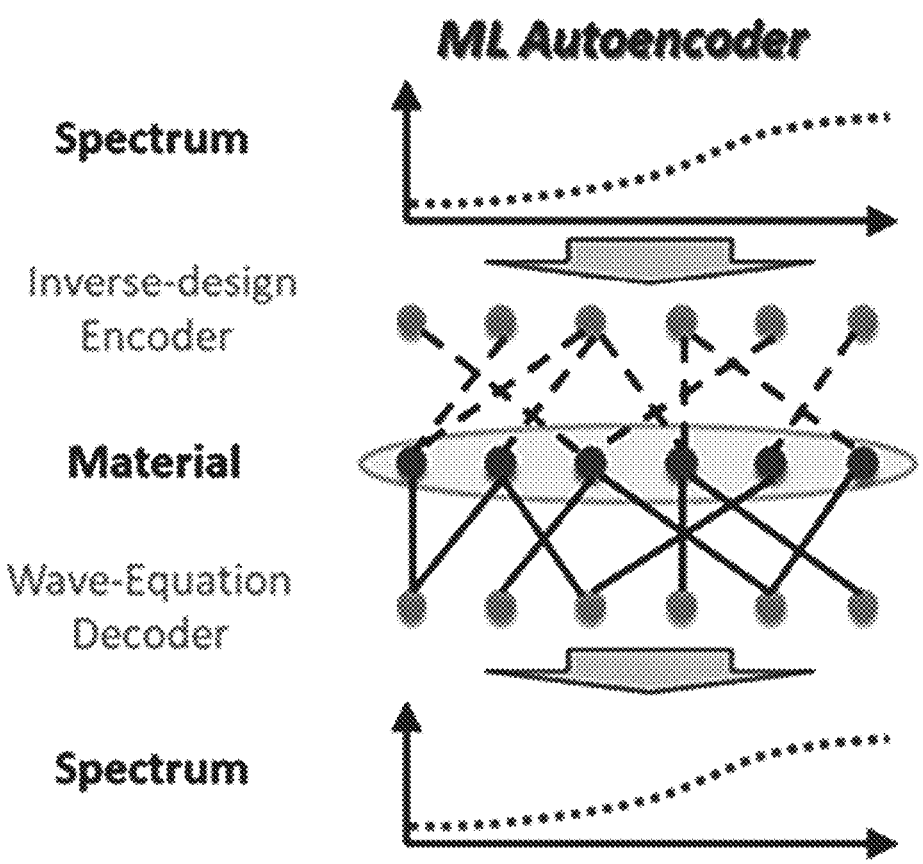
FIG. 1 is an exemplary diagram illustrating a machine learning structure used in a device and method for designing a material using deep learning according to an exemplary embodiment of the present invention.

Hereinafter, a device and method for designing a material using deep learning according to exemplary embodiments of the present invention will be described with reference to the accompanying drawings. In this process, thicknesses of lines, sizes of elements, etc. shown in the drawings may be exaggerated for clarity and convenience of description. Further, the terms used below are defined in consideration of functionality in the present invention and may vary depending on an intention of a user or an operator or a usual practice. Therefore, definitions thereof should be made on the basis of the overall content of this specification.

FIG. 1 is an exemplary diagram illustrating a machine learning structure used in a device and method for designing a material using deep learning according to an exemplary embodiment of the present invention.

As shown in FIG. 1, the present invention employs a machine learning autoencoder including a decoder, which derives wave properties from a given medium or structure, and an encoder, which designs a medium or structure from given wave properties. The autoencoder is optimized through techniques, such as supervised learning, reinforcement learning, and unsupervised learning, and thus a material may be inversely designed to obtain targeted wave properties.

In this case, the targeted wave properties, for example, a given localization property or frequency property, may be obtained by various candidates for a medium or structure. Among the candidates, a medium or structure to be actually obtained is selected according to characteristics and the like of matrix calculation and an activation function in a trained artificial neural network.

Meanwhile, a new material proposed by the present invention as being robust to a defect and having good modulation properties utilizes network characteristics of an artificial neural network used in deep learning. In particular, when a network has characteristics of a scale-free network, a medium designed by the network also has the characteristics of a scale-free network.

Characteristics of such a scale-free network are fundamentally generated because an artificial neural network simulates the brain which is a scale-free network. Among several candidates for a medium and structure for achieving desired wave properties, a material (medium and structure) having characteristics of a scale-free network may be selected using such structural characteristics of the network. Such a scale-free medium and structure have properties of being robust to errors and being sensitive to intended modulation which are fundamental characteristics of a scale-free network.

In other words, the corresponding material is not only robust to errors or noise which may occur during a process or experiment but is also very sensitive to modulation which may be designed and provided in advance such that a wave device with high efficiency may be implemented.

Figure 2:
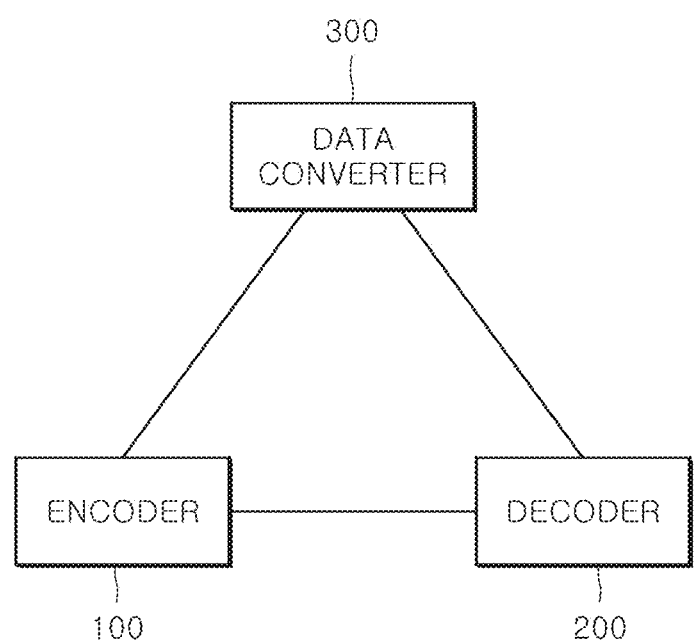
FIG. 2 is a block diagram showing a configuration of a device for designing a material using deep learning according to the exemplary embodiment of the present invention.

FIG. 2 is a block diagram showing a configuration of a device for designing a material using deep learning according to the exemplary embodiment of the present invention.

As shown in FIG. 2, the device for designing a material using deep learning according to the exemplary embodiment of the present invention includes an encoder 100, a decoder 200, and a data converter 300.

The encoder 100 and the decoder 200 correspond to the encoder and decoder of the above-described autoencoder structure of FIG. 1, and the data converter 300 may convert wave properties and information on a material into data which may be used in an artificial neural network or convert data derived by the encoder 100 or the decoder 200 into wave properties and information on the material.

The encoder 100, the decoder 200, and the data converter 300 may be implemented as a computing device. For example, the computing device may include a processor and a memory coupled to the processor, and the memory may include instructions configured to cause the processor to perform operations according to a method of designing a material using deep learning which will be described below.

The encoder 100, the decoder 200, and the data converter 300 may be configured as separate computing devices or may be configured such that functions thereof may be implemented in one computing device.

The decoder 200 is configured to derive wave properties from given information on the material and may be trained in advance using material information, ground truth of wave properties, and the like.

The encoder 100 may be configured with the decoder 200 in the form of an autoencoder and trained to derive information on a material from given wave properties when training is performed.

The data converter 300 may convert wave property data into the form of data which may be input to the encoder 100 (e.g., data configured in an image form or the like), convert information data of a material into the form of data which may be input to the decoder 200, or convert data output from the encoder 100 into the form of data which represents information on a material.

Meanwhile, detailed operations of the encoder 100, the decoder 200, and the data converter 300 may be performed in the same way as a method of designing a material using deep learning according to an exemplary embodiment of the present invention to be described below.

Figure 3:
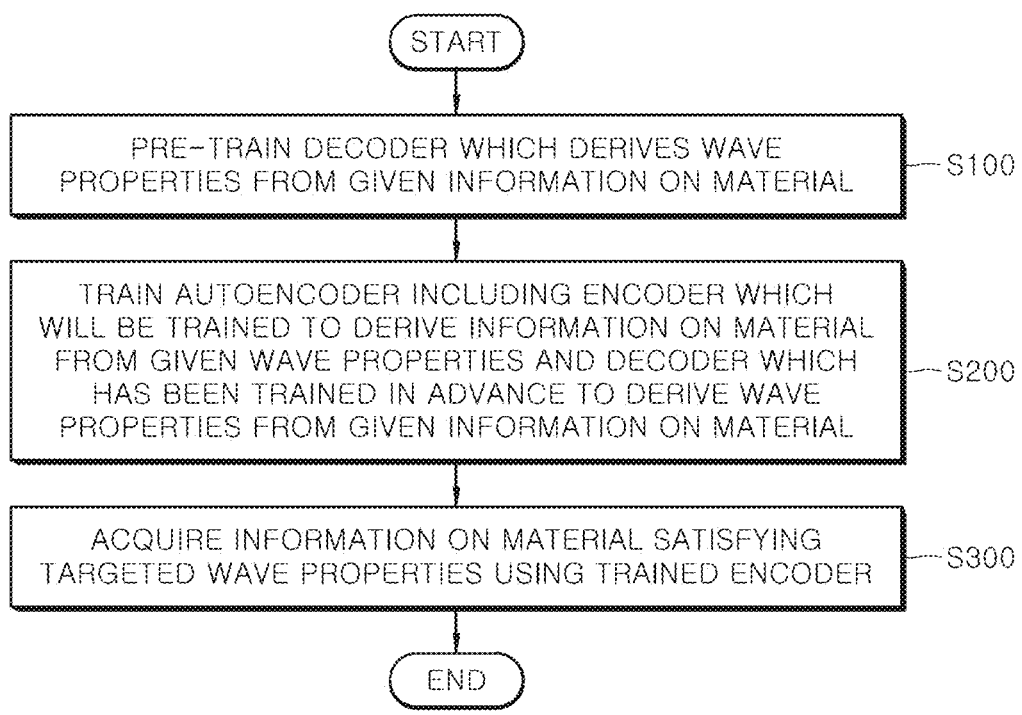
FIG. 3 is a flowchart illustrating a method of designing a material using deep learning according to the exemplary embodiment of the present invention.
Figure 4:
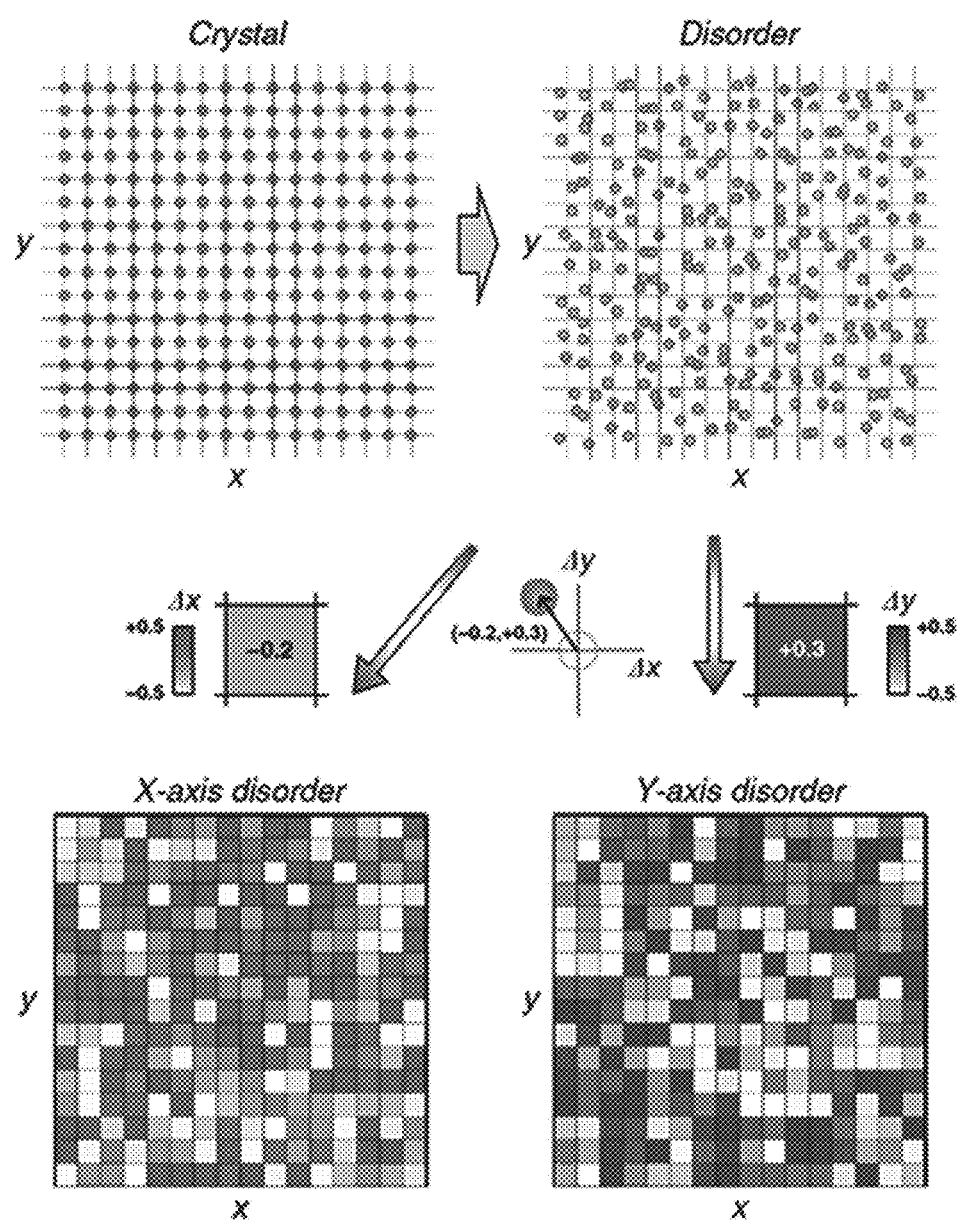
FIG. 4 is an exemplary diagram illustrating a method of converting a structure of a material into image data in the method of designing a material using deep learning according to the exemplary embodiment of the present invention.
Figure 5:
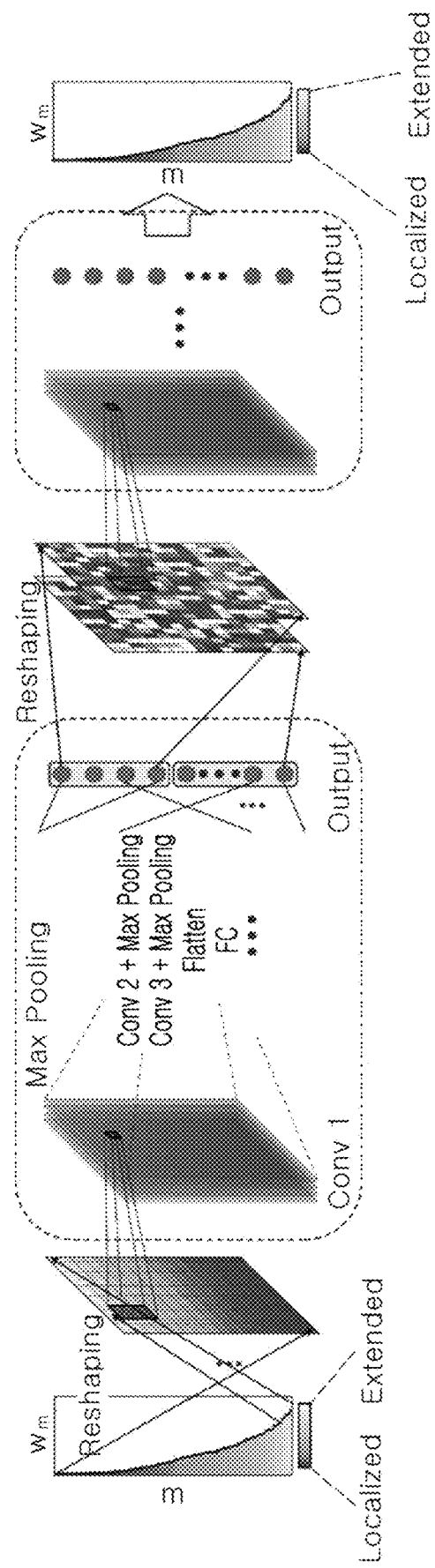
FIG. 5 is an exemplary diagram showing artificial neural network configuration information in the method of designing a material using deep learning according to the exemplary embodiment of the present invention.

FIG. 3 is a flowchart illustrating a method of designing a material using deep learning according to the exemplary embodiment of the present invention, FIG. 4 is the exemplary diagram illustrating a method of converting a structure of a material into image data in the method of designing a material using deep learning according to the exemplary embodiment of the present invention, and FIG. 5 is an exemplary diagram showing artificial neural network configuration information in the method of designing a material using deep learning according to the exemplary embodiment of the present invention.

As shown in FIG. 3, first, a decoder which derives wave properties from given information on a material is trained in advance (S100).

Here, the information on a material at least includes a material structure and may further include information on each particle (atom) (e.g., a type of each particle, energy of each particle, spin of each particle, and an orbital of each particle).

Such information on a material may be converted into a form which is usable in an artificial neural network as shown in FIG. 4.

FIG. 4 shows a method of converting a two-dimensional (2D) medium into image data. First, information about how much a position has been changed in a crystal medium, which each particle in the crystal medium is periodically arranged, may be represented as $\Delta x$ and $\Delta y$ with respect to coordinate axes. Here, $\Delta x$ and $\Delta y$ have values defined for each particle arranged in two dimensions and thus may be shown as $\Delta x_{m,n}$ and $\Delta y_{m,n}$ in the two dimensions, respectively. As a result, $\Delta x$ and $\Delta y$ may be represented as two 2D images.

In this way, even a three-dimensional (3D) medium may be represented as three 3D tensors, and thus medium structure information is usable as an input to a deep learning artificial neural network.

Meanwhile, a 2D medium may be implemented, for example, by arranging particles on a silicone layer, and a 3D medium may be implemented in the form of a meta-structure or the like.

Also, particle information may be converted into a form usable in the artificial neural network by adding image data to each piece of the particle information. For example, when each particle corresponds to one of ten types of compounds, the ten types are classified in units of 0.1 and shown as depth information (brightness of a pixel) as shown in FIG. 4, and the depth information may be represented as 2D images or 3D tensors.

Meanwhile, wave properties of a material may have the form of a 2D image represented with an x-axis and a y-axis as shown in FIG. 5, 6, or the like. Accordingly, wave properties may be configured in a form which is directly input to the artificial neural network.

A decoder which derives wave properties from given information on a material may be trained with training data obtained by converting already-known information on materials and wave properties of the materials such that an encoder may be configured to derive information on a material from given wave properties according to training of an autoencoder.

In other words, after the operation S100, the autoencoder including the encoder, which will be trained to derive information on a material from given wave properties, and the decoder, which has been trained in advance to derive wave properties from given material information, is trained (S200).

For example, such an autoencoder may be configured with a convolutional neural network (CNN) as shown in FIG. 5. A structure of the autoencoder is trained in a way of minimizing a value of a cost function in which machine-learning estimation wave properties, which are finally obtained from given wave properties, are compared with the given wave properties.

However, the present invention is not limited to a CNN structure and may employ an artificial neural network configured in the form of a recurrent neural network (RNN) or a deep neural network (DNN).

Subsequently, the trained encoder is used to acquire material information which satisfies targeted wave properties (S300). In other words, since the encoder of the autoencoder may be trained to derive information on a material from given wave properties according to the above-described training of the autoencoder, targeted wave properties are input to the trained encoder, and the result is acquired to derive information on a material from the given wave properties.

Figure 6:
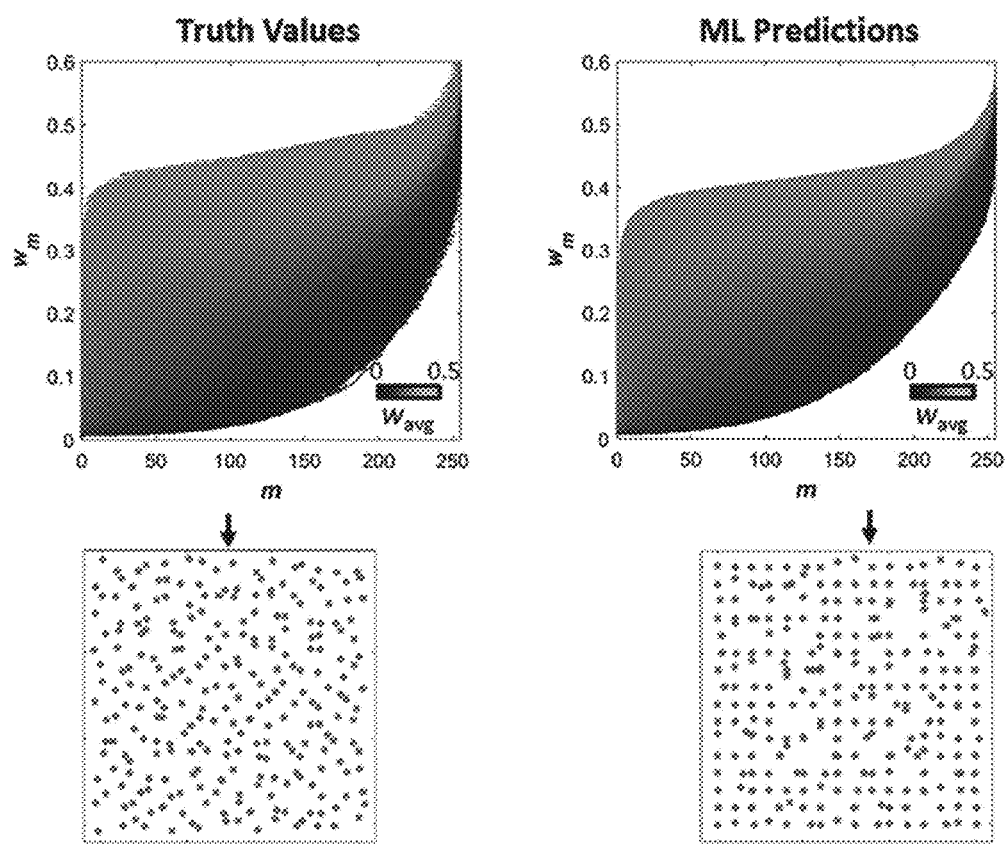
FIG. 6 is a set of exemplary diagrams showing an inverse design method based on deep learning and the result in the method of designing a material using deep learning according to the exemplary embodiment of the present invention.
Figure 7:
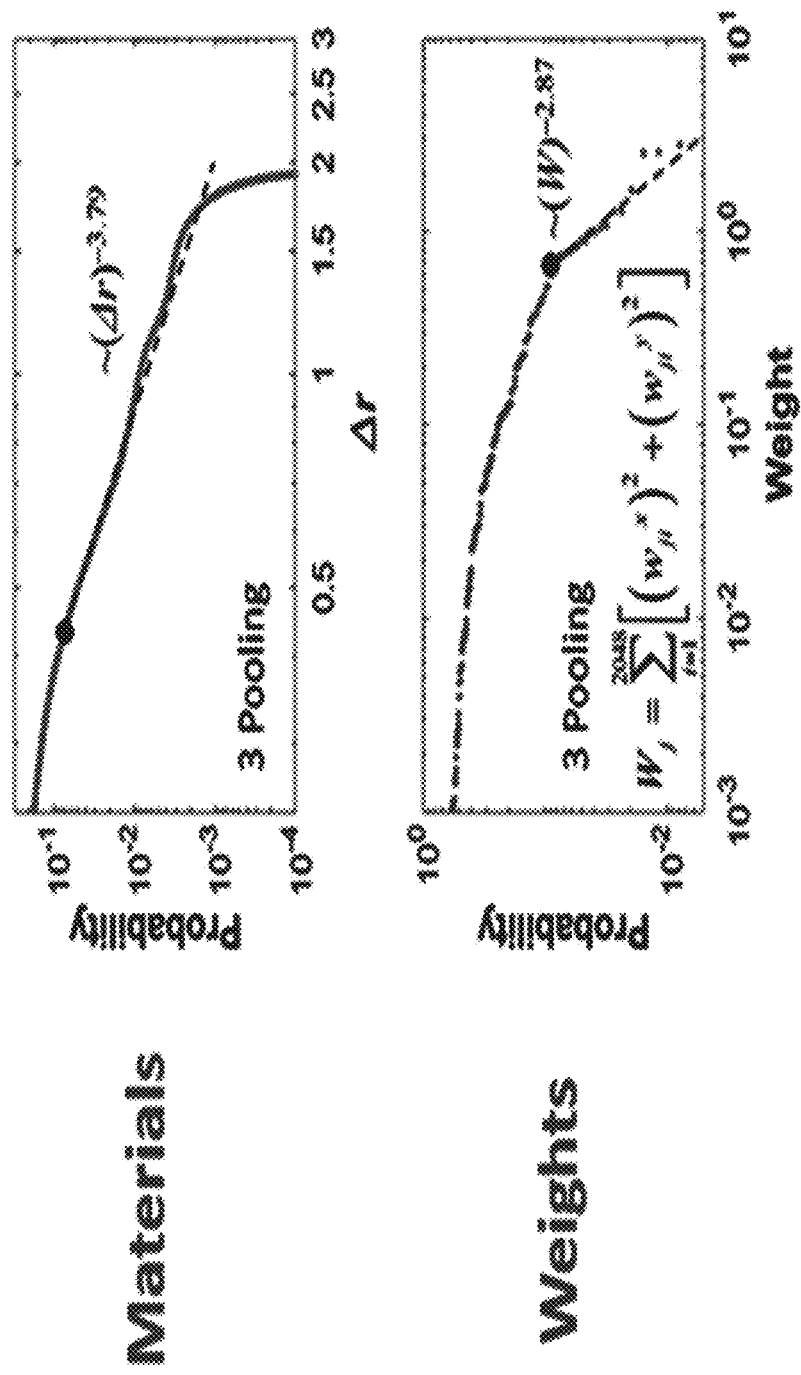
FIG. 7 is a set of exemplary diagrams illustrating statistical properties of a material shown in FIG. 6.
Figure 8:
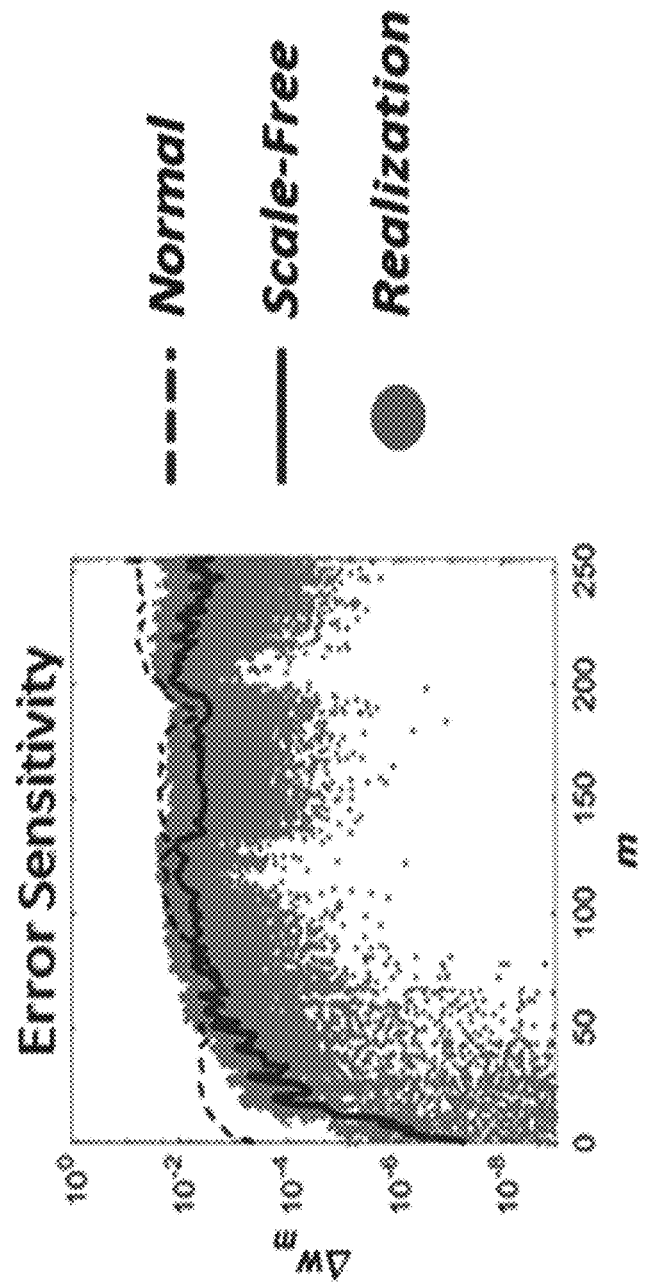
FIG. 8 is an exemplary diagram showing how stably information on a space occupied by a wave or localization information is maintained when a defect is applied to a new material designed through the method of designing a material using deep learning according to the exemplary embodiment of the present invention.
Figure 9:
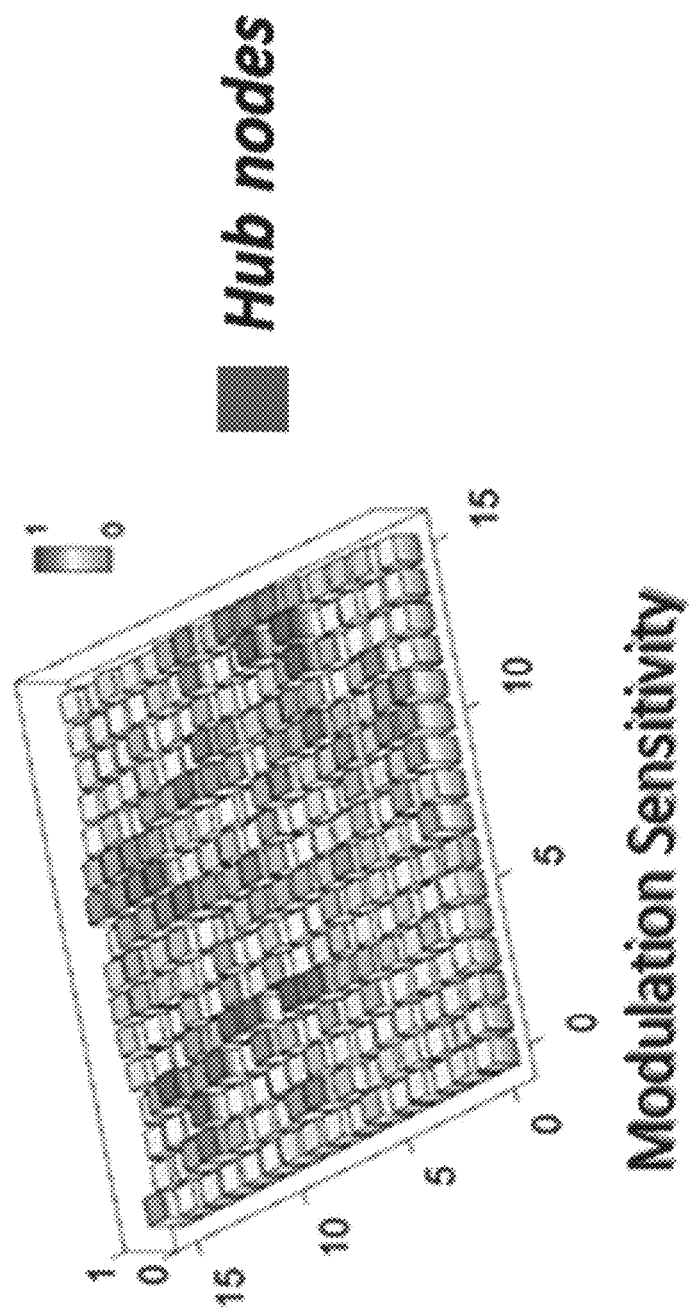
FIG. 9 is an exemplary diagram showing sensitivity of a new material, which is designed through the method of designing a material using deep learning according to the exemplary embodiment of the present invention, to modulation.

A wave-based active signal processing element, a waveguide, an antenna, a display, a solar cell, an electronic circuit signal processing element, etc. may be designed and implemented on the basis of the derived material information. FIG. 6 is a set of exemplary diagrams showing an inverse design method based on deep learning and the result in the method of designing a material using deep learning according to the exemplary embodiment of the present invention, and FIG. 7 is a set of exemplary diagrams illustrating statistical properties of a material shown in FIG. 6. FIG. 8 is an exemplary diagram showing how stably information on a space occupied by a wave or localization information is maintained when a defect is applied to a new material designed through the method of designing a material using deep learning according to the exemplary embodiment of the present invention, and FIG. 9 is an exemplary diagram showing sensitivity of a new material, which is designed through the method of designing a material using deep learning according to the exemplary embodiment of the present invention, to modulation. The following results are obtained from the device and method for designing a material using deep learning according to the exemplary embodiment of the present invention.

In FIG. 6, a disordered material having statistically uniform defects and wave properties thereof is shown on the left and compared with a material which is inversely designed on the basis of the wave properties by the device and method for designing a material using deep learning according to the exemplary embodiment of the present invention. FIG. 6 shows that the two materials may have different structures.

In FIG. 7, statistical properties of the material designed in FIG. 6 are analyzed and compared with statistical characteristics of network structures in deep learning artificial neural networks. As shown in the drawing, the statistical properties of the material and the statistical characteristics of the internal networks follow very similar power laws. Since a power law statistically defines a scale-free network, it may be seen that the inversely-designed material has a scale-free network structure and the corresponding network characteristics result from scale-free network characteristics of an artificial neural network which simulates the brain.

FIG. 8 shows a result of verifying how a new material, which is implemented through inverse design according to the present invention, having scale-free network characteristics is sensitive to a defect applied to each particle. FIG. 8 shows how stably information on a space occupied by a wave or localization information is maintained when a defect is applied to the new material. To obtain the result, wave properties of 20,000 samples of disordered materials which are statistically uniform and include 256 particles are derived through numerical analysis, and an artificial neural network is trained with the materials and the wave property data.

After a defect is applied to each particle of a scale-free disordered material inversely designed through the artificial neural network and a statistically uniform disordered material, it is determined how stably spatial information or localization information is maintained in each of 256 modes. As a result, it may be seen that the scale-free disordered material inversely designed through the deep learning technique is about 10 to 100 times or more robust to a defect in each of the wave modes.

FIG. 9 shows how sensitive the scale-free disordered material analyzed in FIG. 8 is to designed modulation. A modulation property of the scale-free disordered material shows efficiency that is about 10 times higher than that of the statistically uniform disordered material, and the increase in the modulation efficiency represents the existence of hub nodes which may be observed in a scale-free network. In other words, it may be seen that some particles operate as hub particles which are combined with other particles far more closely than average.

The device and method for designing a material using deep learning according to the present invention train an autoencoder including a decoder, which has been trained in advance to derive wave properties from given material information, and an encoder, which will be trained to derive material information from given wave properties such that an encoder may be configured to derive information on a material from given wave properties. Accordingly, it is possible to inversely design a material which satisfies targeted wave properties.

In this way, the present invention can implement a wave platform with error resistance that is 100 times better than before, and also the platform has modulation efficiency that is 10 times higher or more than a general disordered material. Accordingly, it is possible to implement a waveguide for active signal processing and an antenna which have very high efficiency and are very robust to switching and errors, a display which is very robust to a process and signal noise, and the like. Also, it is possible to implement a solar cell and the like having constant absorption and conversion efficiency for the incidence angle of light which varies depending on the installation angle, weather conditions, and the like. Further, the corresponding design technique uses fundamental network characteristics of a deep learning artificial neural network and thus can be applied to designing of electronic circuits and semiconductor devices as well as design of wave platforms.

Although the present invention has been described above with reference to the exemplary embodiments shown in the drawings, the embodiments are merely illustrative, and those of ordinary skill in the art will appreciate that various modifications and equivalents can be made from the embodiments. Therefore, the technical scope of the present invention should be determined by the following claims.

What is claimed is:

1. A method of designing a material using deep learning, the method comprising:
   pre-training a decoder, which derives wave properties from given information on a material;
   training an autoencoder including the decoder and an encoder which will be trained to derive information on a material from given wave properties; and
   inputting targeted wave properties to the trained encoder to acquire information on a material satisfying the input wave properties,
   wherein the given information on the material includes at least a structure of the material,
   wherein the pre-training of the decoder comprises converting the information on the material into an image form,
   wherein the converting of the information on the material into the image form comprises calculating a positional displacement of each particle in a crystal structure which each particle is periodically arranged and representing the calculated positional displacement as an image to convert the structure of the material into an image form.

2. The method of claim 1, wherein the converting of the information on the material into the image form comprises representing the calculated positional displacement as brightness of a pixel to convert the structure of the material into the image form.

3. The method of claim 1, wherein the pre-training of the decoder comprises training the decoder using training data including information on materials and wave properties of the materials.

4. The method of claim 1, wherein the given information on the material further includes a type of each particle of the material.

5. The method of claim 1, wherein the autoencoder is implemented in a form of a convolutional neural network (CNN), a recurrent neural network (RNN), or a deep neural network (DNN).

6. A device for designing a material using deep learning, the device comprising:
   a processor; and
   a memory coupled to the processor,
   wherein the memory includes instructions configured to cause the processor to perform the method of claim 1.

* * * * *